United States Patent [19]

Yamamoto et al.

[11] Patent Number: 4,835,694
[45] Date of Patent: May 30, 1989

[54] CONTROL SYSTEM FOR AUTOMATIC TRANSMISSION

[75] Inventors: Keiichi Yamamoto, Okazaki; Kazuo Ishikawa, Hoi, Japan

[73] Assignee: Aisin Seiki Kabushiki Kaisha, Aichi, Japan

[21] Appl. No.: 23,077

[22] Filed: Mar. 6, 1987

[30] Foreign Application Priority Data

Mar. 13, 1986 [JP] Japan .................................. 61-55982

[51] Int. Cl.⁴ ...................... B60K 41/02; F16D 25/12; G06F 15/20
[52] U.S. Cl. .................................. 364/424.1; 74/866; 192/0.052; 192/0.092
[58] Field of Search ........................ 369/424.1; 74/866; 123/479; 192/0.09, 0.092, 0.094, 0.052

[56] References Cited

U.S. PATENT DOCUMENTS

| | | | |
|---|---|---|---|
| 4,338,832 | 7/1982 | Pelligrino | 74/866 |
| 4,373,619 | 2/1983 | Schritt et al. | 192/0.09 X |
| 4,393,467 | 7/1983 | Miki et al. | 364/424.1 |
| 4,395,905 | 8/1983 | Fujimori et al. | 73/119 A |
| 4,414,863 | 11/1983 | Heino | 74/866 |
| 4,450,812 | 5/1984 | Otsuka et al. | 123/479 X |
| 4,471,438 | 9/1984 | Futagi et al. | 364/424.1 |
| 4,667,541 | 5/1987 | Shimaoka et al. | 364/424.1 |
| 4,708,032 | 11/1987 | Harada et al. | 74/866 |

Primary Examiner—Felix D. Gruber
Attorney, Agent, or Firm—Sughrue, Mion, Zinn, Macpeak & Seas

[57] ABSTRACT

An automatic transmission includes a torque converter with a directly coupled clutch. A plurality of rotational speed sensors are used in the control of a lockup and a shifting operation. The invention provides an arrangement to detect any abnormality associated with such sensors. Under the lockup condition of the torque converter, a speed Ve detected by an engine rotational speed sensor, and speeds Vsp1 and Vsp2 detected by a first and a second vehicle speed sensor and a speed ratio $K_1$ of a change gearing are used to detect any abnormality associated with the three sensors. All of the sensors are determined to be properly functioning when the equalities $Ve=K_1 \cdot Vsp1$ and $Ve=K_1 \cdot Vsp2$ apply. The first vehicle speed sensor is determined to be faulty when the former equation applies while the latter equation does not apply, and the second vehicle speed sensor is determined to be faulty when the former equality applies while the latter does not apply. When the both equalities do not hold, the engine rotational speed sensor is determined to be faulty.

13 Claims, 10 Drawing Sheets

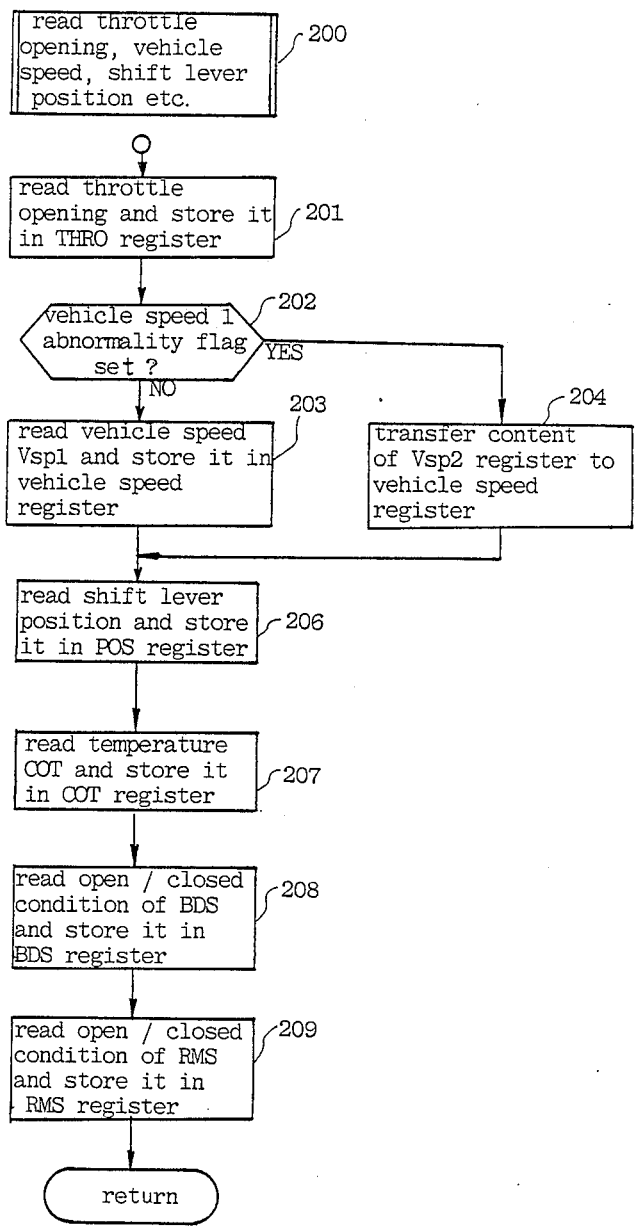

CONTROL SYSTEM FOR AUTOMATIC TRANSMISSION

FIELD OF THE INVENTION

The invention relates to a control of a shifting operation and a lockup operation of an automatic transmission, and in particular, to the detection of an abnormality of rotational speed detectors which are used in the control.

PRIOR ART

An automatic transmission including a torque converter enables a smooth starting, acceleration and speed change of a vehicle. A fluid coupling is established when a vehicle load is low and when the number of revolutions of a engine is high. Under this condition, a power loss due to a slip in the automatic transmission increases, causing a temperature rise of a working fluid of the torque converter and an increase in the fuel cost. To accommodate for this, a directly coupled clutch is provided in the automatic transmission so that an output shaft of the engine is directly coupled to an input shaft of a change gearing (i.e., lockup) in a range of operation where the fuel cost increases.

A lockup control of the kind described is disclosed in U.S. Pat. No. 4,393,467 issued to Nobuaki Miki et al, for example.

In the automatic shift and lockup control system disclosed in U.S. Pat. No. 4,393,467, vehicle speeds where an up shift should occur to achieve a higher vehicle speed with a given accelerating performance (hereafter referred to as "up shift reference information") as well as vehicle speeds where a down shift should occur so as to prevent a loading upon an engine (hereafter referred to as "down shift reference information") are stored in a read only memory (ROM) so as to be a function of both a throttle opening and a prevailing speed range of the vehicle. A running load is detected in accordance with a corresponding program, and the up and the down shift reference information is corrected in accordance with the load detected to derive reference values which are to be used in the decision of a shifting operation. When a prevailing vehicle speed is equal to or greater than an up shift reference value, a change gearing is actuated to establish a higher speed range. On the contrary, when a prevailing vehicle speed is equal to or less than a down shift reference value, the change gearing is actuated to establish a lower speed range.

On the other hand, a speed ratio e of a torque converter is determined experimentally which achieves a high driving performance and a low fuel cost in each of the second to the fourth speed range, and vehicle speeds at which a lockup is activated and terminated are previously stored in ROM in a manner corresponding to a throttle opening. A prevailing vehicle speed or the rotational speed of the output shaft of an automatic transmission is compared against a predetermined lockup activate and/or terminate vehicle speed in a manner corresponding to a throttle valve opening so that when the prevailing vehicle speed is equal to or greater than the lockup activate vehicle speed, a directly coupled clutch is actuated while if the prevailing vehicle speed becomes equal to or less than the lockup terminate vehicle speed, the directly coupled clutch is deactuated.

In this manner, it has been the practice in the prior art to utilize the vehicle speed or the rotational speed of the output shaft of an automatic transmission as a parameter to determine the need to effect a shifting operation and also as a parameter to determine the need to activate and/or terminate the lockup. Accordingly, the shift and the lockup control will fail if any abnormality occurs in a vehicle speed detector or in an electrical circuit extending from the detector to lockup control means or shift control means.

To improve this, there has been a proposal to provide a pair of vehicle speed detectors so that in the event one of the detectors produces a signal representing a vehicle speed while the other fails to produce such signal, it is determined that the other detector or its associated electrical circuit is faulty, thus making resort to the vehicle speed which has been detected by the one detector in the control of the shifting operation and the lockup. However, even with this arrangement, either vehicle speed detector may be mounted loosely or may involve a rattling to result in inaccuracies in the vehicle speed signal detected. Any such inaccuracy cannot be detected as a matter of practice, and it is also impossible to determine which one of the detectors is accurate or faulty. Consequently, there results a high probability that a faulty control over the shifting operation or the lockup may take place based on an inaccurate vehicle speed signal.

SUMMARY OF THE INVENTION

It is an object of the invention to reduce an error which may be produced in a vehicle speed detected, thereby contributing to an improved accuracy in a control of the shifting operation or the lockup of an automatic transmission.

The above object is accomplished in accordance with the invention by providing a control system comprising at least two vehicle speed detecting means including first and second detecting means, third detecting means for detecting the rotational speed of the output shaft of an engine, first decision means for comparing the rotational speed detected by the first detecting means against the rotational speed detected by the third detecting means to determine the presence of any abnormality relative to each other during the time a lockup condition is established, second decision means for comparing the rotational speed detected by the second detecting means against the rotational speed detected by the third detecting means to determine the presence of any abnormality relative to each other, and vehicle speed designating means for designating a speed detected by the first detecting means as a vehicle speed in the absence of an abnormality as determined by the first decision means and for designating a speed detected by the second detecting means as a vehicle speed in the absence of an abnormality as determined by the second decision means. The control over the lockup and the shifting operation is performed using the vehicle speed which is designated in this manner.

In the lockup condition, the torque converter is bypassed or the input shaft of the torque converter or the output shaft of the engine is directly coupled to the output shaft thereof or to the input shaft of the change gearing by the directly coupled clutch, and accordingly the rotational speed of the input shaft of the change gearing represents the rotational speed Ve of the engine which is detected by third detecting means. First and second detecting means detect the rotational speed of the output shaft of the change gearing, and hence denoting the speed detected by the first detecting means by Vsp1 and the speed detected by the second detecting means by Vsp2, it will be seen that if all of the first to the third detecting means operate normally and the operation for detection of the speeds takes place in a perfect manner, the following relationship is established:

$$Ve = K_1 \cdot Vsp1 = K_1 \cdot Vsp2 \tag{1}$$

where $K_1$ represents a constant (a gear ratio) determined by a particular speed range in which the change gearing is operated. In the event the signal generated by the first detecting means is faulty, the equality $Ve = K_1 \cdot Vsp1$ does not apply while $Ve = K_1 \cdot Vsp2$ applies. Conversely, if the signal generated by the second detecting means is faulty, the equality $Ve = K_1 \cdot Vsp1$ applies while the equality $Ve = K_1 \cdot Vsp2$ does not apply. If the third detecting means is faulty, neither the equality $Ve = K_1 \cdot Vsp1$ nor the equality $Ve = K_1 \cdot Vsp2$ applies.

Accordingly, in the control system of the invention, the rotational speed detected by the first detecting means is compared against the rotational speed detected by the third detecting means during the time the lockup condition is established, and also the rotational speed detected by the second detecting means is compared against the rotaional speed detected by the third detecting means during the time the lockup is established, whereby any abnormality associated with at least the first and the second detecting means can be detected. A speed detected by a properly functioning detecting means is used as a parameter which is referred to in the control of the lockup and the shifting operation. Accordingly any abnormality associated with at least the first and the second detecting means can be detected uniquely, assuring that the control over the lockup and the shifting operation takes place using a speed detected by a properly functioning detecting means as a parameter.

The use of the third detecting means which detects the rotational speed of the engine in the control system of the invention permits the calculation of a speed ratio of the torque converter utilizing the speed detected by the third detecting means in preferred embodiments of the invention. The calculated speed ratio can be compared against selected values to determine the need to activate the lockup. The lockup control as well as advantages which it brings forth will now be described briefly.

Speed ratios e of a torque converter disclosed in U.S. Pat. No. 4,393,467 are experimentally determined in a manner corresponding to the throttle valve opening in order to improve the driving performance and to reduce the fuel cost, and values of the vehicle speed to activate and to terminate the lockup which nearly approximate these values of the speed ratio are initially stored in a read only memory (ROM). A speed ratio e represents the ratio of the rotational speed of an input shaft of a change gearing or the rotational speed of the output shaft of the torque converter to the rotational speed of the engine or the rotational speed of the input shaft of the torque converter. An electronic circuit compares a vehicle speed against values of the vehicle speed which are predetermined to activate or terminate the lockup and which are stored in ROM (reference data) in order to determine the necessity to activate the lockup. However, because reference data is provided as discrete digital values which are selected in a rough manner, when examined closely, the lockup control result in driving the vehicle under a high fluid coupling condition (the lockup is activated with a low speed ratio) at one time or driving the vehicle with a low torque lockup (with a speed ratio of 1 and with a low output torque from the engine) at another time. In the former instance, the fuel cost increases, and the temperature of the torque converter rises. In the latter instance, the accelerating capability of the vehicle becomes degraded.

Specifically, at low speed ratios, the input shaft of the torque converter or the output shaft of the engine has a high torque while its output shaft or the input shaft of the change gearing has a low torque, with a differential therebetween being dissipated as a heat loss (an increase in the fuel cost) by causing a temperature rise of working fluid within the torque converter. When the vehicle is driven with a low torque lockup (with a speed ratio of 1 and the low output torque), the engine may be overloaded.

In preferred embodiments of the invention, the rotational speed Ve of the engine which is detected by the third detecting means is used to calculate the speed ratio e. Denoting the speed detected by either the first or the second detecting means by Vsp, the speed ratio of the torque converter is given by the following equality:

$$e = K_1 \cdot Vsp / Ve \tag{2}$$

The relationship of the torque ratio and the heat value within the torque converter with respect to the speed ratio e thereof is graphically shown in FIG. 2a. As illustrated, the heat value is at its maximum as is the torque ratio at speed ratio $e = 0$. As the speed ratio e increases, the heat value decreases as does the torque ratio. The heat value substantially reaches its minimum value at speed ratio e of 0.85 where the torque ratio is substantially equal to 1. It will be seen from this relationship that the use of the lockup at the speed ratio e of 0.85 or greater provides an accelerating response which is similar to or better than that obtained under the fluid coupling condition (without the lockup). Under the fluid coupling condition, the heat value within the torque converter increases from the minimum value obtained at speed ratio of 0.85, as the speed ratio e further increases, and has another peak in a region of speed ratios from 0.95 to 1.00. The use of the lockup for speed ratios of approximately 0.85 and higher substantially eliminates the heat value within the torque converter, and thus it will be seen that the lockup can be used preferably at the speed ratio of 0.85 and higher from the standpoints of the accelerating capability of the vehicle and the heat value within the torque converter.

Consequently, a speed ratio $e_L$ to activate the lockup is established and is stored in a memory, as indicated at RRM in FIG. 2b. A different value of such speed ratio is used as a function of a throttle opening in order to maintain the fluid coupling condition (without the lockup) to as high a speed ratio as possible since the throttle opening corresponds to the available power from the engine and when it is high, the lockup condition would result in the liability that the engine may be highly loaded in response to a variation in the running road condition or a variation in the throttle opening.

In accordance with the invention, the speed ratio e is calculated during the time the vehicle is running, and an RRM value which corresponds to a particular throttle opening is read from the memory. By comparing the actual speed ratio e against the read value (RRM), the lockup is established for e≧RRM. The speed ratio e=1 (constant value) is reached as a result of the lockup, and the speed ratio e is no longer available to determine the need to terminate the lockup. For this reason, a value of the vehicle speed Vsp, $V_{Lu}$, which prevails when the lockup is established, is stored in a memory. The subsequent vehicle speed Vsp is compared against the stored value $V_{Lu}$, from which a preset value ΔV is substracted, or $V_{Lu}-\Delta V$, and the lockup is terminated if it is found that Vsp≦($V_{Lu}-\Delta V$). Specifically, referring to FIG. 2c, when the lockup is established at $V_{Lu}$, the lockup is terminated at $V_{Lu}-\Delta V$. The purpose of providing such a hysteresis by an amount of ΔV is to prevent a hunting effect at the boundary of $V_{Lu}$ if the lockup is terminated as soon as the vehicle speed becomes less than $V_{Lu}$.

It is preferred that the magnitude of ΔV be chosen in accordance with the operating status of the engine or throttle opening. Specifically, when a high throttle opening is used or when the engine is providing a high output, this means that the vehicle is running with an increased load, and hence it is desirable that a smaller value be used for ΔV. Accordingly, in a preferred embodiment of the invention, the magnitude of ΔV is chosen in a manner corresponding to the throttle opening and is stored in a memory, as indicated by a solid line curve RMO in FIG. 2d. Thus, whenever the lockup is established, a value of ΔV which corresponds to the throttle opening is read from memory RMO, and is subtracted from the value $V_{Lu}$ which has been stored in a memory when the lockup is established. The vehicle speed Vsp is then compared against $V_{Lu}-\Delta V$, and the lockup is terminated if it is found that Vsp≦($V_{Lu}-\Delta V$). When a smaller value is chosen for ΔV, as indicated by a phantom line curve RMC in FIG. 2d, the region of ΔV in which the lockup remains effective is reduced, providing an increased probability that the fluid coupling of the torque converter produces a smooth running condition with a torque response which is balanced with a running condition. In this manner, the running response may be changed. By way of example, such response may be changed according to the intention of a driver or according to the running condition, in particular, the vehicle load or according to the inclination of the down or up slope. For this reason, in a preferred embodiment of the invention, a response selection switch (RMS) is provided to select either RMO or RMC.

It will be seen that an excessive temperature rise of the torque converter can be prevented by moving the speed ratio $e_L$ where the lockup is established toward a lower value or by increasing the extent in which the lockup is effective. Thus, in a preferred embodiment of the invention, means is provided for detecting the temperature of the torque converter, and a plurality of sets of speed ratio $e_L$ which is referred to in determining the need to activate the lockup are provided. A particular one set is chosen in response to a detected temperature of the torque converter, and is used as a reference to determine the need to activate the lockup. As shown in FIG. 2b, three sets RRL, RRM and RRH are used for the speed ratio $e_L$. RRL is used as a reference when the torque converter exhibits a low temperature, RRM is used as a reference for a medium temperature, and RRH is used as a reference at elevated temperatures. It will be appreciated that a temperature rise is of no concern at low temperatures of the torque converter, and hence RRL is preset to a high value so that the fluid coupling may be fully effective. At medium temperatures, the temperature rise must be suppressed to a degree while taking advantage of the fluid coupling, and thus RRM is at a slightly reduced level. At elevated temperatures, the temperature rise must be suppressed to a greater degree, and hence RRH is set at a further reduced level. Thus, as the temperature of the torque converter increases, the region in which the lockup is activated is extended in a direction to reduce the heat value within the torque converter.

In a first embodiment of the invention, the speed ratio e is calculated utilizing the rotational speed of the engine detected by the third detecting means, and during the lockup control, if any abnormality associated with the third detecting means is detected, the lockup is terminated. This prevents an abnormal lockup in a low vehicle speed range which may cause a load impact upon the engine in the event the third detecting means is faulty. When the lockup is maintained terminated, it is likely that the fuel cost will increase and the heating value within the torque converter increases, but this should be a satisfactory remedy against the abnormality of the third detecting means.

In a second embodiment of the invention, whenever an abnormality associated with the third detecting means is detected, the lockup control is switched from using the speed ratio e as a parameter to the use of the vehicle speed (the rotational speed of the output shaft of the change gearing) as a parameter as disclosed in U.S. Pat. No. 4,393,467. In this embodiment, an abnormal lockup in a low vehicle speed range which may cause a load shock upon the engine is prevented in the event the third detecting means is faulty while enabling a normal lockup control in the same manner as before, without causing any remarkable increase in the fuel cost or an excessive heating within the torque converter, thus providing a effective remedy against the abnormality of the third detecting means.

Other objects and features of the invention will become apparent from the following description of embodiments thereof with reference to the drawings.

BRIEF DESCRIPTION OF THE DRAWINGS

FIG. 1b is a block diagram of a change gearing shown in FIG. 1a;

FIG. 2a graphically shows the relationship between the heating value within and the torque ratio of the torque converter plotted against the speed ratio of the torque converter shown in FIG. 1a;

FIGS. 3a, 3b, 3c, 3d and 3e are flowcharts of control operations performed by the microprocessor shown in FIG. 1b.

DESCRIPTION OF PREFERRED EMBODIMENT

Figure 1A:
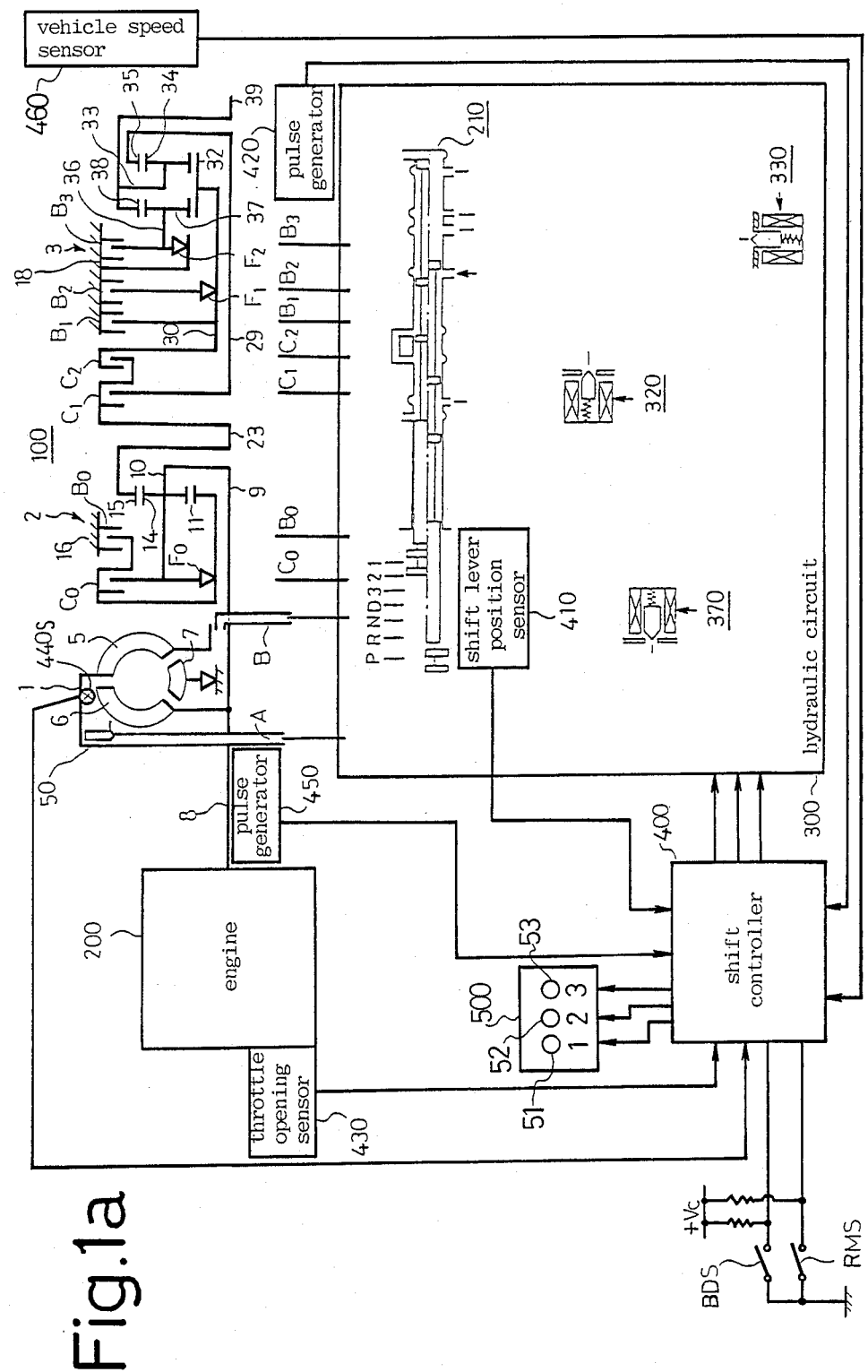
FIG. 1a is a block diagram of one embodiment of the invention, essentially illustrating the mechanical parts.

A general arrangement of one preferred embodiment of the invention is illustrated in FIG. 1a, and includes an automatic transmission 100 and a hydraulic circuit 300 which controls the transmission, both of which remains the same as those disclosed in U.S. Pat. No. 4,393,467 cited above.

Specifically, the automatic transmission 100 is a fluid operated transmission with an overdrive, and includes a torque converter 1 having a directly coupled clutch 50 associated therewith, an overdrive mechanism 2 and 3 forward/1 reverse stage, change gearing 3. The torque converter 1 is well known in itself and includes a pump 5, a turbine 6 and a stator 7, with the pump 5 being connected to a crankshaft or an output shaft 8 of an engine and the turbine 6 connected to a turbine shaft 9, which represents an output shaft of the torque converter 1 and which also represents an input shaft of the overdrive mechanism 2. Thus, within the overdrive mechanism 2, the turbine shaft 9 is connected to a carrier 10 of a planetary gearing. A directly coupled clutch 50 is disposed between the crankshaft 8 and the turbine shaft 9 to provide a mechanical interconnection therebetween whenever the clutch is operated. A planetary pinion 14 is rotatably carried by the carrier 10 and is in meshing engagement with a sun gear 11 and a ring gear 15. Disposed between the sun gear 11 and the carrier 10 are an overdrive multiple disc clutch $C_0$ and an overdrive one-way clutch $F_0$, and an overdrive multiple disc brake $B_0$ is disposed between the sun gear 11 and a housing or an overdrive casing 16 which contains the overdrive mechanism.

The ring gear 15 of the overdrive mechanism 2 is connected to an input shaft 23 of the change gearing 3. A front multiple disc clutch $C_1$ is disposed between the input shaft 23 and an intermediate shaft 29 while a reverse multiple disc clutch $C_2$ is disposed between the input shaft 23 and a sun gear shaft 30. Disposed between the sun gear shaft 30 and a transmission casing 18 are a multiple disc brake $B_1$ and a multiple disc brake $B_2$ in tandem relationship with a one-way clutch $F_1$. A sun gear 32 is mounted on the sun gear shaft 30, and defines a pair of epicyclic gearings together with a carrier 33, a planetary pinion 34 carried by the carrier 33, another carrier 36, another planetary pinion 37 carried by the carrier 36 and a ring gear 38 in meshing engagement with the pinion 37. In one epicyclic gearing, the ring gear 35 is connected to the intermediate shaft 29, and the carrier 33 of this gearing is connected to the ring gear 38 of the other epicyclic gearing, with both the carrier 33 and the ring gear 38 being connected to an output shaft 39. Disposed between the transmission casing 18 and the carrier 36 of the other epicyclic gearing are a multiple disc brake $B_3$ and a one-way clutch $F_2$.

In the hydraulic automatic transmission 100 with overdrive mentioned above, the various clutches and brakes are either engaged or disengaged by the hydraulic circuit 300 in accordance with an output from the engine 200 or a corresponding throttle opening and the vehicle speed or the rotational speed of the output shaft 39, thus shifting the vehicle speed to one of four forward speed ranges including the overdrive (O/D) or manually to the single reverse speed range.

Table 1 below indicates operating conditions of the various clutches and brakes in response to a particular shift gear position of a manual shift valve 210.

TABLE 1

| shift position | frictional device | | | | | | | | | |
|---|---|---|---|---|---|---|---|---|---|---|
| | clutch $C_0$ | clutch $C_1$ | clutch $C_2$ | brake $B_0$ | brake $B_1$ | brake $B_3$ | brake $B_2$ | one-way clutch $F_0$ | one-way clutch $F_2$ | one-way clutch $F_1$ |
| parking P | o | x | x | x | x | o | x | | | |
| reverse R | o | x | o | x | x | o | x | lock | lock | |
| neutral N | o | x | x | x | x | x | x | | | |
| forward | | | | | | | | | | |
| D-range | | | | | | | | | | |
| 1st | o | o | x | x | x | x | x | lock | lock | overrun |
| 2nd | o | o | x | x | o | x | o | lock | overrun | lock |
| 3rd | o | o | o | x | x | x | o | lock | overrun | overrun |
| O.D. (4th) | x | o | o | o | x | x | o | overrun | overrun | overrun |
| 3-range | | | | | | | | | | |
| 1st | o | o | x | x | x | x | x | lock | lock | overrun |
| 2nd | o | o | x | x | x | x | o | lock | overrun | lock |
| 3rd | o | o | o | x | x | x | o | lock | overrun | overrun |
| 2-range | | | | | | | | | | |
| 1st | o | o | x | x | x | x | x | lock | lock | overrun |
| 2nd | o | o | x | x | o | x | o | lock | overrun | lock |
| L-range | o | o | x | x | x | o | x | lock | lock | overrun | where o represents that a corresponding clutch or brake is engaged while x indicates that it is disengaged.

The hydraulic circuit 300 which selectively operates the clutches $C_0$ to $C_2$, the brakes $B_0$ to $B_3$ and the directly coupled clutch 50 of the automatic transmission 100 to achieve an automatic shift operation is disclosed in U.S. Pat. No. 4,393,467 cited above and is well known in the art, and therefore its arrangement and operation will not be described in detail. As mentioned previously, the hydraulic circuit 300 includes the manual shift valve 210, and it also includes a pair of solenoid valves 320 and 330 which are used to establish a particular speed range. The relationship between a particular speed range selected by a particular combination of the energization or deenergization of these solenoid valves is indicated in Table 2 below.

TABLE 2

| speed range selected | N | D 1st | 2nd | 3rd | 4th | R |
|---|---|---|---|---|---|---|
| solenoid valve 320 | deen* | en** | en | deen | deen | en |
| solenoid valve 330 | deen | en | deen | en | deen | deen |

*"deen" stands for "deenergized";
**"en" stands for "energized".

The hydraulic circuit 300 also includes a solenoid valve 370 which is used to establish a lockup condition. When it is energized, the directly coupled clutch 50 is activated to establish the lockup condition while when it is deenergized, the directly coupled clutch 50 is deactivated to terminate the lockup condition.

The position of the manual shift valve 210 in the hydraulic circuit 300 is detected by a shift lever position sensor 410, which feeds the shift controller 400. The shift controller 400 includes a microprocessor which controls the energization or deenergization of the solenoid valves 320, 330 and 370, thus controlling the shift operation and the lockup condition of the automatic transmission 100. The shift controller 400 also receives an electric pulse which is synchronized with a rotation of the output shaft 39 of the automatic transmission 100 from a pulse generator 420, a signal representing a throttle opening of the engine 200 from a throttle opening sensor 230, an electric pulse which is synchronized with the rotation of the output shaft of the engine from a pulse generator 450, and a signal representing the temperature of working fluid of the torque converter 1 from a temperature sensor 440S. A vehicle speed sensor 460 connected to a speedometer cable 42 (FIG. 1b) produces an analog signal representing a vehicle speed or the rotational speed of the output shaft 39 of the transmission 100 and feeds it to the shift controller 400.

Figure 1B:
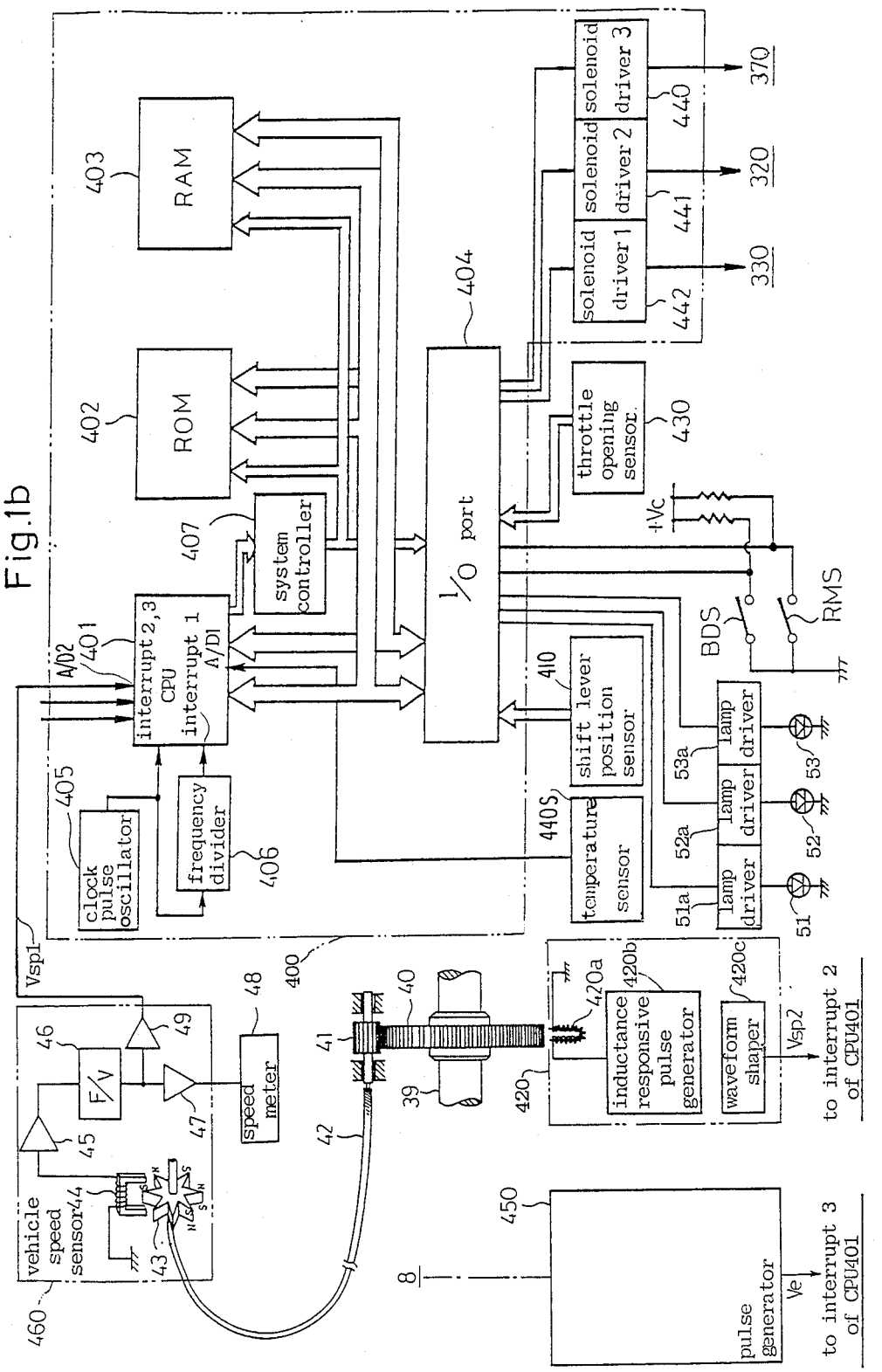

The shift controller 400 is generally shown in FIG. 1b, and is generally similar to a known shift controller as disclosed in U.S. Pat. No. 4,393,467. However, there are certain differences. Specifically, electric pulses generated by the pulse generators 420 and 450 are fed to interrupt ports 2, 3 and are used to calculate a vehicle speed Vsp2 or the rotational speed of the output shaft 39 and also to calculate the rotational speed Ve of the engine. Additional ports are provided which are connected to a brake depression detecting switch BDS and a lockup terminate command switch RMS. An analog temperature signal from the temperature sensor 440S is fed to an A/D conversion port A/D1 to provide the entry of digital temperature data. An analog signal representing a vehicle speed Vsp1 from the speed sensor 460 is fed to another A/D conversion port A/D2 to provide the entry of digital speed data Vsp1. Additionally, in the operating program, the lockup activate/terminate program is modified, and a speed sensor abnormality decision program is included in the program In other respects, the decision for a shift operation and the controlling function remain essentially the same.

More specifically describing the arrangement shown in FIG. 1b, the shift controller 400 essentially comprises a microprocessor 401, and also includes a read only memory (ROM) 402 which permanently stores a program which controls the logical operation of the microprocessor and sundry data, a random access memory (RAM) 403 which stores data read from ROM 402 and temporary input/output data, an input/output port unit 404, a clock pulse oscillator 406, a system controller 407 and solenoid drivers 440, 441 and 442 which energize the solenoid valves 320, 330 and 370, respectively.

Referring to FIG. 1b, the pulse generator 420 will be briefly described. A gear 40 is fixedly mounted on the output shaft of the automatic transmission 100, and an inductance element 420a comprising a core of magnetizable material on which an electrical coil is disposed is disposed in opposing relationship with the tooth tip of the gear 40. As the gear 40 rotates, the electrical coil increases in its inductance value when the tooth tip is located opposite to the element 420, and decreases in its inductance value when the tooth bottom is disposed opposite thereto. A pulse generator 420b develops a voltage which corresponds to a change in the inductance of the coil, and such voltage is shaped by a waveform shaper 420c before it is applied to the interrupt port 2 of the microprocessor 401.

Considering the vehicle speed sensor 460 next, the gear 40 is in meshing engagement with a smaller gear 41 mounted on a shaft, to which one end of a flexible wire 42 is fixedly connected. The other end of the wire 42 is fixedly connected to the center shaft of a permanent magnet gear 43, whereby the gear 43 rotates in synchronism with the gear 40. The gear 43 is polarized such that its opposite surfaces present S- and N-poles while adjacent teeth present poles of opposite polarities on the same surface. A channel-shaped core has a pair of limbs which are sized and dimensioned to have one of the tooth tips to be disposed therebetween, and an electrical coil 44 is disposed on the core. Accordingly, as the gear 43 rotates, a sinusoidal voltage is developed by the coil 44 and is amplified and shaped into a pulse by an amplifier 45 before it is applied to a frequency-to-voltage converter 46. In this manner, the converter 46 develops an analog voltage having a level which corresponds to the rotational speed. The analog voltage is suitably amplified by an amplifier 47 to be applied to the vehicle speedometer 48. The analog voltage is also amplified by an amplifier 49 to be applied to A/D conversion port A/D2 of the microprocessor 401. The pulse generator 450 is constructed in the similar manner as the pulse generator 420, and includes an inductance element disposed opposite to a gear which is fixedly mounted on the engine output shaft 8 or the input shaft of the torque converter.

Returning to the description of the shift controller 400, a clock pulse produced by an oscillator 405 is fed to a clock input of units 401 to 403, and 406. A frequency divider 406 divides the frequency of the clock pulse before it is applied to an interrupt terminal 1 of CPU 401. Each time a clock pulse appears at the terminal 1, CPU 401 executes an interrupt processing operation 1. In the interrupt processing operation 1, CPU 401 detects a change in a running condition as that from running on a flat road to running on a slope or vice versa while examining the current running condition of the vehicle, and alters terms for a decision to lock or switch a speed range in a corresponding manner. Thus, the grade of a slope or a vehicle load is detected by the interrupt processing operation 1. This detection takes place in the same manner as that disclosed in U.S. Pat. No. 4,393,467.

ROM 402 contains a program which is executed to perform the interrupt processing operation 1, and also contains other programs as well as reference data which are used in the decision or detection thereof; including a speed range determining program combined with reference data which is used when running on a flat road, a speed range shifting program and a slope running detecting program combined with its reference data, a speed range shift inhibit program and uninhibit program combined with reference data which are used in the decision and detection thereof, a temporary lockup terminate program which is used during a shifting operation and a throttle opening responsive acceleration detecting program and constants data which are used during the execution thereof. These programs and associated data are disclosed in U.S. Pat. No. 4,393,467.

Reference data stored in ROM 402 which is used to control the shifting operation is essentially the same as that disclosed in U.S. Pat. No. 4,393,467, but a shift controlling program is modified to enable the implementation of the present invention. In addition, ROM 402 also stores a speed sensor abnormality decision program and a lockup activate/terminate controlling program as well as reference data (see FIGS. 2b and 2d) which are used in the execution of these programs.

Referring to FIGS. 3a to 3e which illustrate flowcharts, the control over the shifting operation and the lockup according to the embodiment which is based on the controlling programs and reference data stored in ROM 402 will now be described.

Figure 3A:
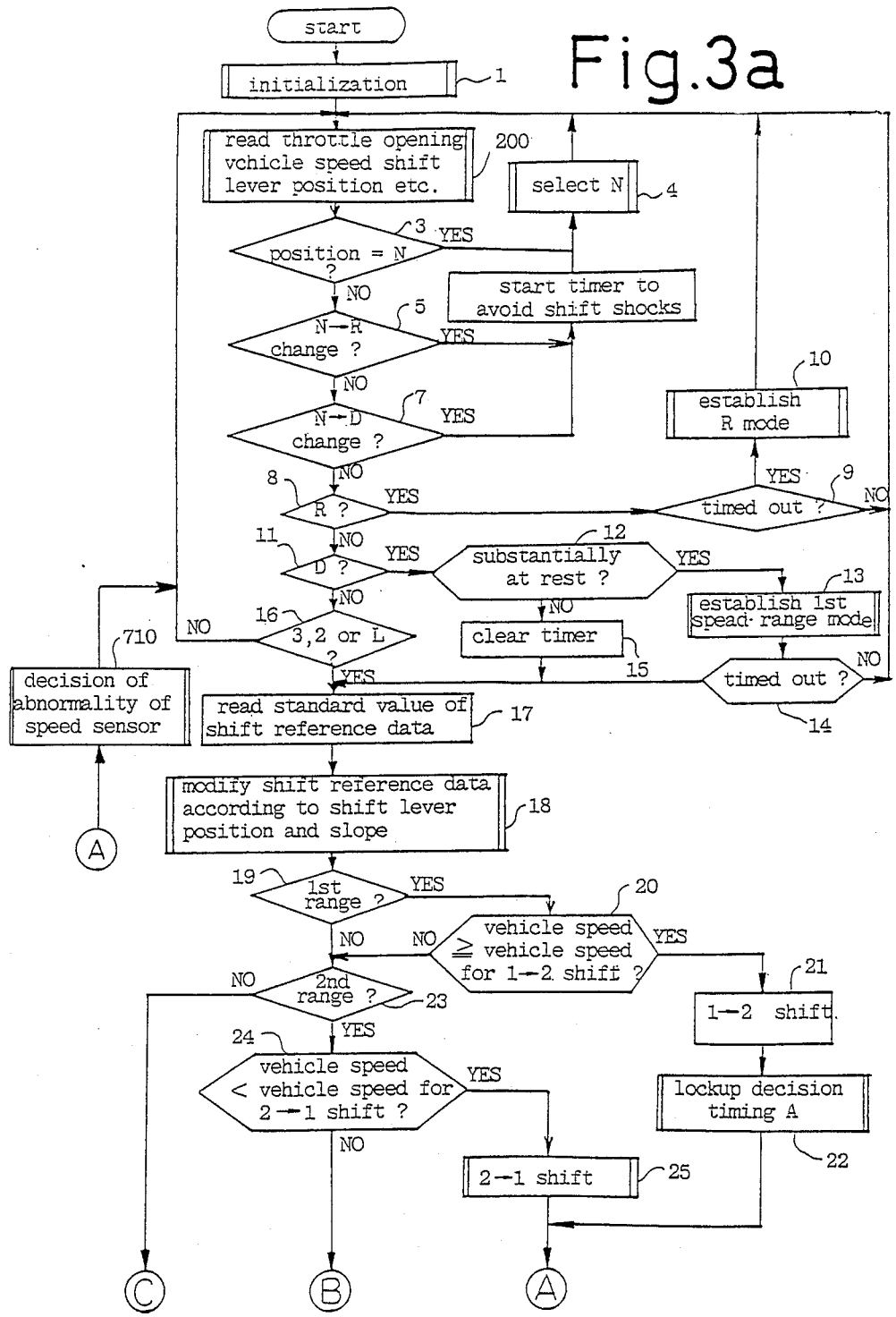

Referring to FIG. 3a, when a power is turned on, CPU 401 clears all of registers and the internal counters, set individual ports in the input/output port unit 404 to their standby levels and reads a signal from the shift lever position sensor 410 (step 1: in the description to follow, a number in parentheses represents a step number). Interrupts 1, 2 and 3 are enabled. Entering the control operation, the microprocessor reads the throttle opening (an output from the sensor 230), the shift lever position (an output from the sensor 410), a vehicle speed Vsp1 (an output from the vehicle speed sensor 460), a vehicle speed Vsp2 (a speed detected on the basis of pulse from the pulse generator 420 by an interrupt 2 operation), an engine rotational speed Ve (a speed detected on the basis of pulse from the pulse generator 450 by an interrupt 3 operation), the temperature of the torque converter COT and the open or closed condition of the switches BDS and RMS (200).

The detail of the reading step (step 200) is illustrated in FIG. 3d. In this step, the throttle opening (an output from sensor 230) is initially read and stored in THRO register (201). The microprocessor then examines a vehicle speed 1 abnormality flag (202), which flag is set or reset at a step 710 to be described later. If it is found that the vehicle speed 1 abnormality flag is not set, the microprocessor reads the speed Vsp1 detected by the sensor 460 and stores it in a vehicle speed register (203). In the event the vehicle speed 1 abnormality flag is set, the content of Vsp2 register is stored in the vehicle speed register (204). The vehicle speed register has a content which is a parameter referred to in the subsequent control over the lockup and the shifting operation. Accordingly, the fact that the flag is not set indicates that the speed detected by the sensor 460 is specified as the parameter while the fact that the flag is set indicates that the speed derived on the basis of the pulse generator 420 is designated as the parameter. The vehicle speed register delivers either speed Vsp1 or Vsp2 which is designated in this manner. At steps 203 and 204, other status is read and stored in a corresponding register.

Since the interrupts have been enabled, each time a vehicle speed detecting pulse (an output pulse from the pulse generator 420) appears at the interrupt port 2, the microprocessor 401 executes an interrupt 2 operation, and each time the pulse count reaches 4, it reads a clock pulse counter 1 (which is an internal counter) to calculate the vehicle speed data Vsp2, which is used to update Vsp2 register. The microprocessor then clears the clock pulse counter 1 and also the pulse counter (a program counter). In other words, it counts a time interval corresponding to four periods of the pulses generated by the pulse generator 420, and uses it to calculate Vsp2. Each time a pulse representing the rotational speed of the engine (or an output pulse from the pulse generator 450) appears at the interrupt port 3, the microprocessor 401 executes an interrupt 3 operation, by reading a clock pulse counter 2 (which is an internal counter) in order to calculate engine rotational speed data Ve, which is then used to update Ve register. It then clears the clock pulse counter 2. In other words, the microprocessor counts a time interval corresponding to one period of a pulse which indicates the rotational speed of the engine, and calculates Ve on the basis of the time interval.

After completing the reading step (200), it examines the shift lever position. Referring to FIG. 3a, if the position is at N, it establishes an N mode (4) in which the solenoid valves 320, 330 are off (see Table 2) and the solenoid valve 370 is off (thus terminating the lockup). Thus, the microprocessor returns to the step 2 to repeat the reading operation. During this reading operation, the shift lever position which has been read is maintained as a previous position while a new position which is subsequently read is stored as an updated, current position.

When the shift lever position changes from N to R, as determined by a comparison between the previous position and the current position (5), a timer is initially started (6) so that a shifting operation takes place with a time lag of a given length in order to prevent shocks during the shifting operation. The same applies to a change of the shift lever position from N to D (7). The microprocessor thus returns to the step 2 to perform a reading operation again. When the shift lever position is at R or when the previous position and the current position are both at R (8), indicating that the timer has already been started, it is examined whether the timer has timed out (9). If it has timed out, there has passed a sufficient time to cover a time lag for the oil pressure if the shift lever position has been changed from a position other than R to a position R through a position N, preventing shocks from occurring as a result of the shifting operation, and accordingly the automatic transmission 100 is allowed to be established in its R mode (see Table 2). When the shift lever position is at D (11), it is examined to see whether or not the vehicle is substantially at rest (12). It is determined that the vehicle is substantially at rest if the throttle opening is equal to zero and the vehicle speed is equal to or less than 5 km/h. If the vehicle is found to be substantially at rest, the automatic transmission is established in its first speed range mode (see Table 2) where the solenoid valves 320 and 330 are energized. It is then examined to see if the timer has timed out (14), and if it has not timed out, the microprocessor waits for the timer to time out (14) or for the vehicle to run in the first speed range (12). If either condition applies, the program proceeds to a portion of the shift control which begins with step 17, because a subsequent shifting operation cannot cause the occurrence of shocks or an engine stop. The shift control beginning with the step 17 is entered from any forward position (D 3, 2 or L range) of the shift lever.

Figure 3B:
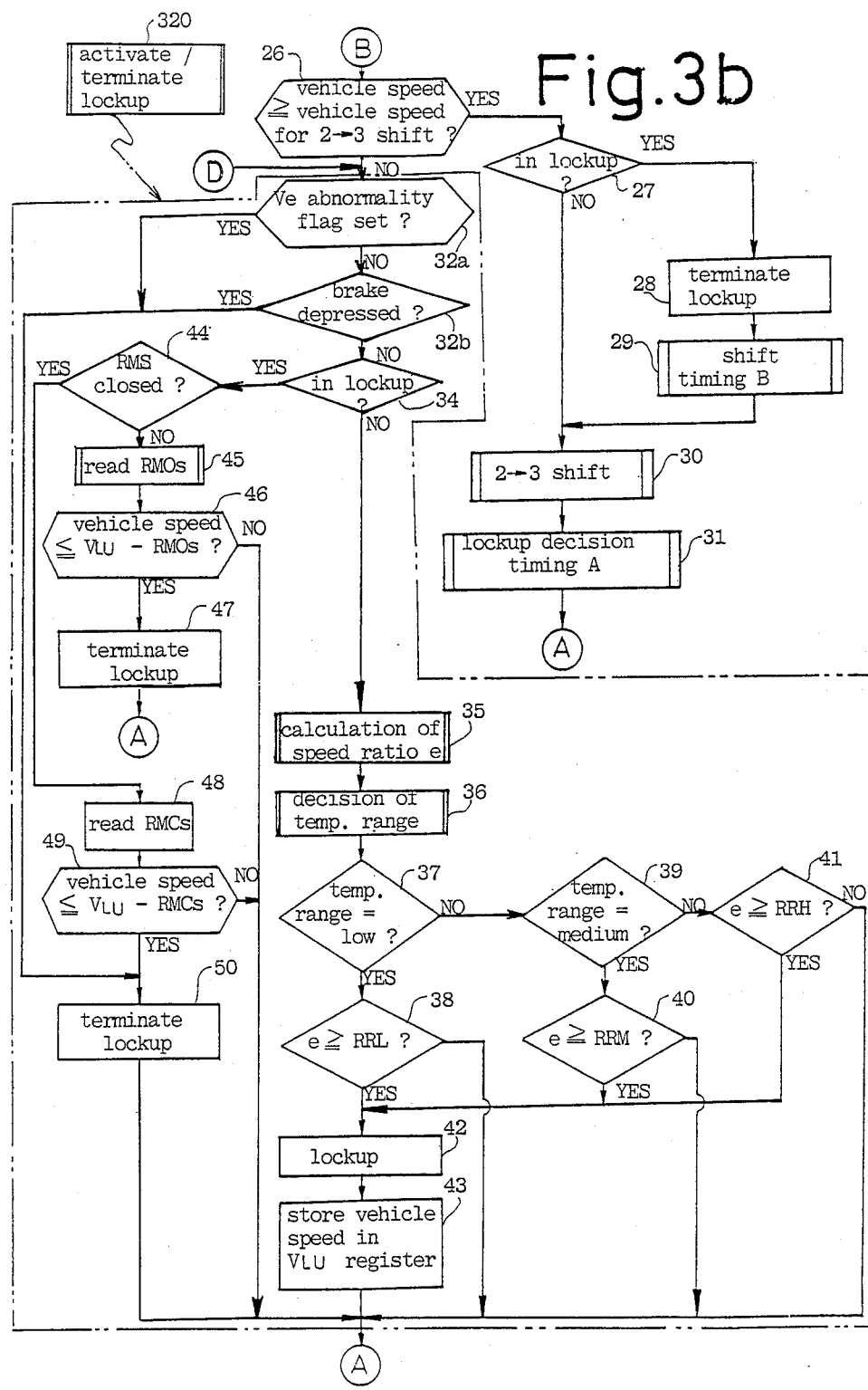
Figure 3C:
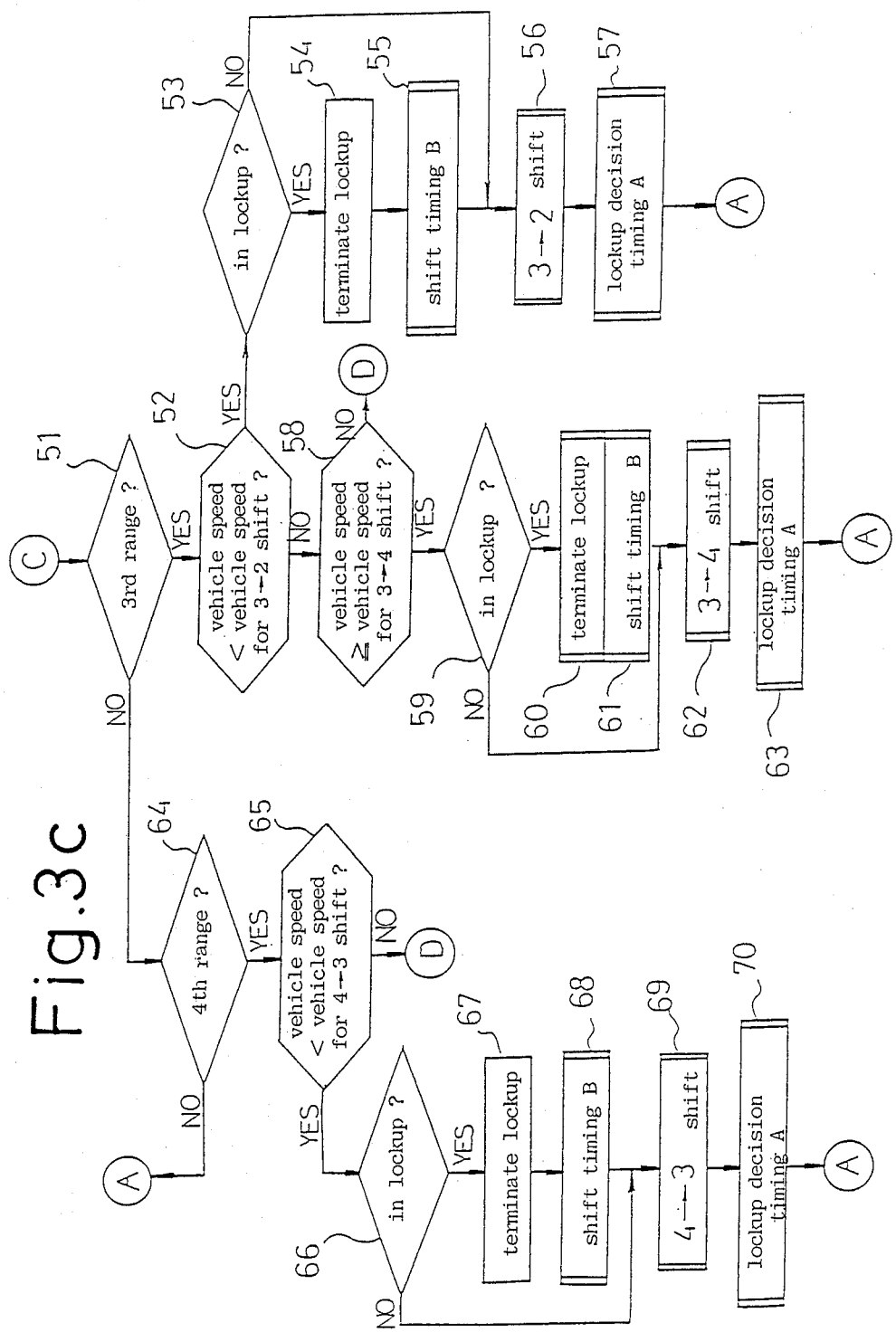

At step 17 of the shift control, standard data which is to be referred to when determining the need for a shifting operation, namely, vehicle speeds for an up shift and a down shift between the various speed ranges and corresponding to different values of the throttle opening when the vehicle is running on a flat road, is read from ROM 402 (17). The standard data is modified in accordance with the prevailing shift lever position and the grade of a slope which has been detected during the previous interrupt operation to produce a shift reference data, which is then written into RAM 403 (18). A shifting operation shown in FIGS. 3a, 3b or 3c takes place by specifying particular data corresponding to a current speed range and throttle opening from among shift reference data which has been prepared in the manner mentioned above at step 18, or specifically, a vehicle speed for an up shift or a down shift, and comparing the current vehicle speed against the vehicle speed for either an up shift (steps 20, 26, 58 in FIGS. 3a, 3b and 3c) or against a vehicle speed for a down shift (steps 24, 52, 65 in FIGS. 3a, 3b and 3c). If the prevailing vehicle speed is equal to or greater than the vehicle speed for an up shift, an up shift occurs (steps 21, 30, 62 in FIGS. 3a, 3b and 3c). Conversely, if the prevailing vehicle speed is less than the vehicle speed for a down shift, a down shift occurs (steps 25, 56, 69 in FIGS. 3a, 3b and 3c). It will be appreciated that shocks may be developed during the shifting operation if the lockup condition is established during such up or down shift. Accordingly, the occurrence of such shocks is prevented by initially terminating the lockup, followed by an up shift or a down shift with a given time lag thereafter (steps 27 to 30, 59 to 62, 53 to 56, 66 to 69 in FIGS. 3a, 3b and 3c). A decision whether the lockup is or is not to be established step 320 in FIG. 3b is made at a given time delay after the completion of the shifting operation (steps 22, 31, 63 and 70). The shift control summarized above is disclosed in detail in U.S. Pat. No. 4,393,367 cited above and is well known in the art.

Figure 2A:
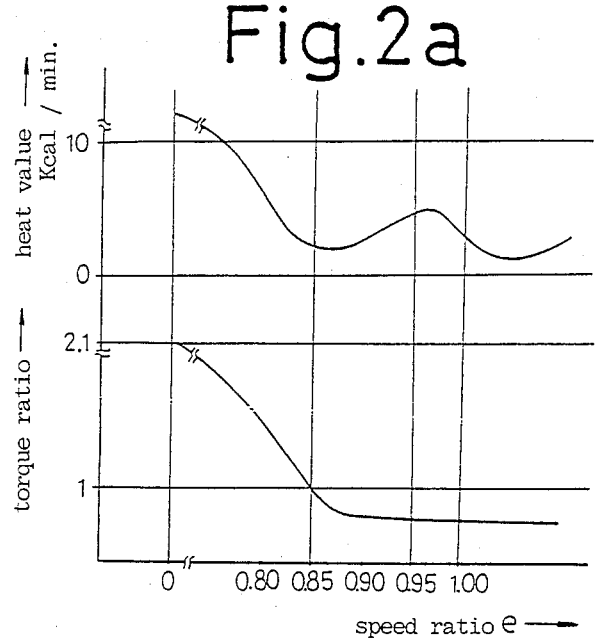
Figure 2B:
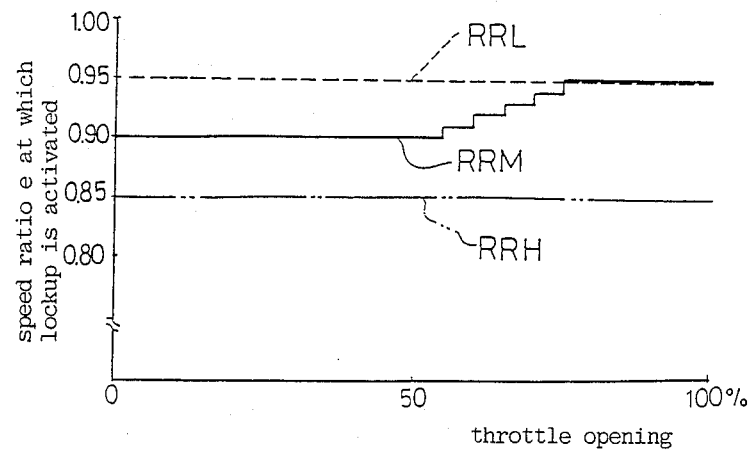
FIG. 2b graphically shows the vehicle speed at which the lockup is activated with the automatic transmission of the embodiment shown in FIG. 1a, plotted against the throttle opening.
Figure 2C:
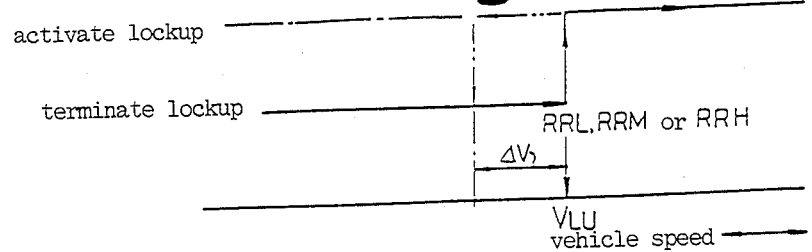
FIG. 2c graphically shows an offset between the vehicle speeds at which the lockup is activated and terminated.
Figure 2D:
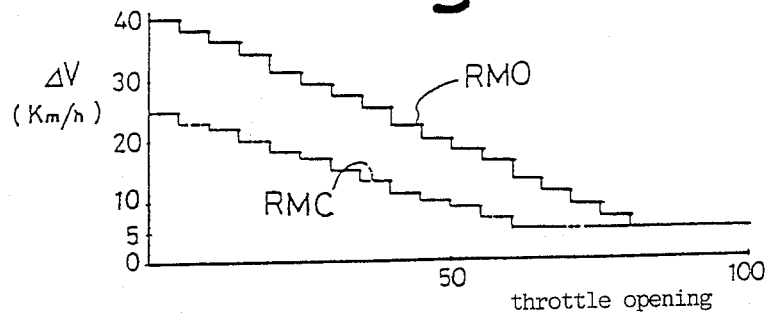
FIG. 2d graphically shows the magnitude of the offset in relation to the throttle opening.

A region in each speed range for which the lockup is preferred is indicated by speed ratios which are disposed above curves RRL, RRM and RRH shown in FIG. 2b which are available when the temperature of the torque converter is low, medium or high, respectively. Accordingly, the lockup is established for speed ratios which are located above these curves, and the prevailing value $V_{Lu}$ of the vehicle speed Vsp is stored in a memory, and after the lockup has been activated, Vsp is compared against ($V_{Lu}$−RMO or RMC), and the lockup is terminated if it is found that Vsp≦($V_{Lu}$−RMO or RMC). The activation or termination of the lockup is executed at step 320 (32a to 43) shown in FIG. 3b. Referring to this Figure, the microprocessor initially examines if Ve abnormality flag is set (32a). (If this flag is set, this means that the speed Ve detected on the basis of the third detecting means or pulse generator 450 is faulty, and the flag is set or reset at step 710 to be described later.) If the flag is set, there is a high probability that the activation of the lockup based on the detected speed ratio e may prove to be erroneous, and hence the lockup is terminated (50).

If the Ve abnormality flag is not set, the microprocessor examines the status of the brake depression detecting switch BDS (32b). If the brake is being depressed (or the switch BDS is closed), this means that the braking operation is applied, and accordingly the lockup is terminated (50). However, if the brake is not being depressed (or the switch BDS is open), it then determines if the lockup condition is established (34). This can be determined by seeing if the solenoid valve 370 is energized (the lockup established) or not (the lockup terminated). If the lockup is terminated, the microprocessor calculates the speed ratio e (35). At this end, the particular speed range (one of the first to the fourth speed range) which is now used is examined in order to specify $K_1$ value which corresponds to the speed range (see the equation (2)), and calculates the speed ratio e according to the equation (2) using the $K_1$ value specified.

The temperature COT of the torque converter 1 is then examined to determine a particular temperature range (36). For COT≦30° C., "low temperature" data is stored in a temperature range register; for 35° C.≦COT≦50° C., "intermediate temperature" data is stored in the temperature range register; and for 60° C.≦COT, "high temperature" data is stored in the temperature range register. For 30° C.<COT<35° C. or 50° C.<COT<60° C., the content of the temperature range register is not changed. In the event no data is stored in the temperature range register (which occurs immediately after the initialization step 1), low temperature data is stored in the register. Consequently, as COT rises, the content of the temperature range register corresponds to a low temperature for COT<35° C., to an intermediate temperature for 35° C.<COT<60° C., and to a high temperature for 60° C.≦COT. Conversely, as COT falls, the content of the register corresponds to a high temperature for 50° C.<COT, to an intermediate temperature for 30° C.<COT≦50° C., and to a low temperature for COT≦30° C. The purpose of providing a hysteresis response in the determination of the temperature range is to prevent a frequent crossing when COT is located adjacent to the boundary.

When the temperature range has been determined (36), a particular group of lockup reference data which corresponds to the temperature range, thus either RRL for low temperature, RRM for intermediate temperature or RRH for high temperature, is specified, and specific data in the specified group which corresponds to the prevailing throttle opening is read, and is compared against the calculated speed ratio e (37 to 40). If the speed ratio e is equal to or greater than the read value, the lockup is established (42: Specifically, a high level H is established at an output port leading to the solenoid driver 440), nd the prevailing vehicle speed Vsp is stored in $V_{Lu}$ register (43).

If it is found at step 34 or upon entering lockup activate/terminate routine that the lockup is established, the status of the unlock response selecting switch RMS is initially examined (44). If the switch is open, the unlock reference data group RMO (FIG. 2d) is specified, and making reference to the prevailing throttle opening, a value RMOs in the group RMO and corresponding to the throttle opening is read (45). The prevailing vehicle speed Vsp is compared against ($V_{Lu}$−RMOs) (46). It will be understood that $V_{Lu}$ represents the content of $V_{Lu}$ register. If it is found that the vehicle speed Vsp≦($V_{Lu}$−RMOs), the lockup is terminated (47: Specifically, an L level is set at an output port to the solenoid driver 440). If it is found that the vehicle speed Vsp>($V_{Lu}$−RMOs), the lockup is maintained.

When it is found at step 44 that the unlock response selecting switch RMS is closed, the unlock reference data group RMC (FIG. 2d) is specified, and the value RMCs in the group RMC and corresponding to the prevailing throttle opening is read (48). The prevailing vehicle speed Vsp is compared against ($V_{Lu}$ − RMCs) (49). If it is found that the vehicle speed Vsp ≦ ($V_{Lu}$ − RMCs), the lockup is terminated (50: Specifically, an L level is set at an output port to the solenoid driver 440). If it is found that the vehicle speed Vsp > ($V_{Lu}$ − RMCs), the lockup is maintained. The described lockup activate/terminate step 320 is executed in the second, the third and the fourth speed range.

After the execution of the lockup decision timing A (22, 31, 57, 63, 70) and the activation/termination of the lockup (320), the program proceeds to a speed sensor abnormality decision (710 in FIG. 3a), and after the execution of this step, the program returns to the reading step 200 to execute the control over the shifting operation and the lockup in the same manner as mentioned previously.

Figure 3E:
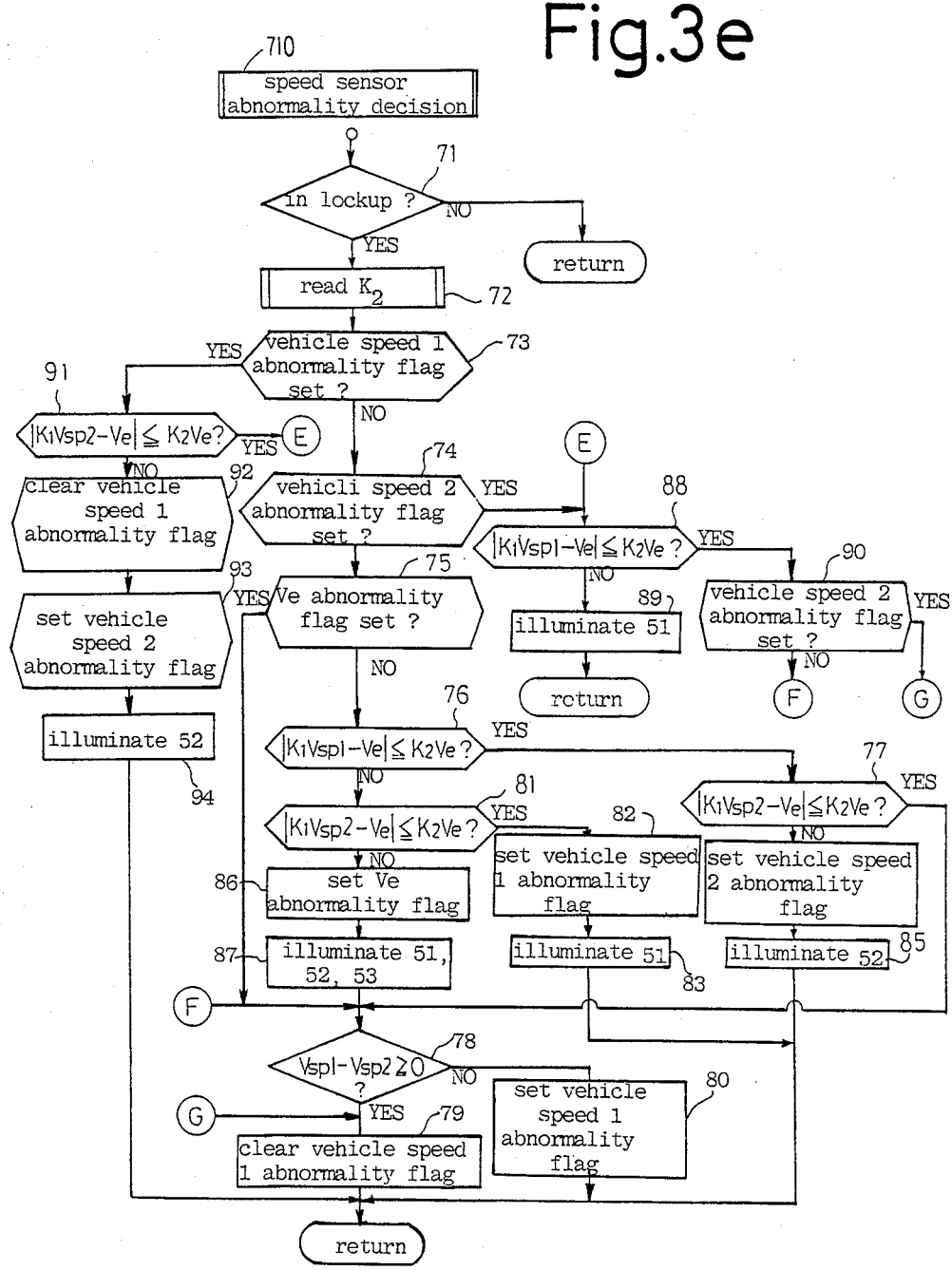

The speed sensor abnormality decision step 710 is specifically shown in FIG. 3e. Upon entering this step, the microprocessor initially examines if the lockup condition is established (71) by seeing if an H level is output to the solenoid driver 440. If the lockup condition is not established, the program proceeds to the reading step 200. If the lockup condition is established, the microprocessor reads the constant $K_2$.

Figure 2E:
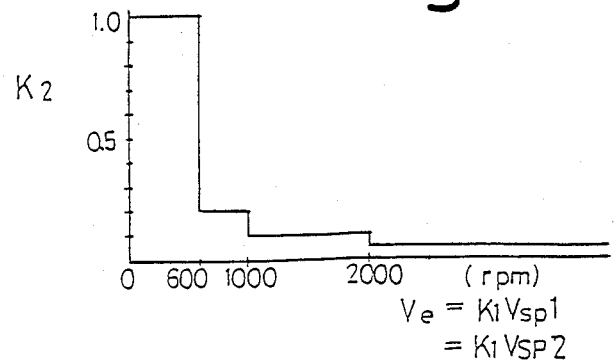
FIG. 2e graphically shows the value of a coefficient $K_2$ which sets an allowance used in the decision of an abnormality associated with a sensor, plotted as a function of the rotational speed of the engine.

It will be noted that the constant $K_2$ is determined in a manner corresponding to the rotational speed Ve of the engine as is illustrated in FIG. 2e, and is stored in ROM 402. Ve is compared against $K_1 \cdot Vsp2$, and Ve is compared against $K_1 \cdot Vsp1$ according to the equation (1) (76, 77, 81, 88, 91). When the speed detecting means (420, 450, 460) is functioning properly as is the signal path from these detecting means to the microprocessor 401, there should be established the equality between Ve and $K_1 \cdot Vsp1$ and between Ve and $K_1 \cdot Vsp2$ theoretically, but in practice, tolerances in the electrical circuit cause a deviation, to a greater or lesser degree, from the exact equality. Accordingly, in the present embodiment, an allowance is introduced by a coefficient $K_2$ such that if $|K_1 \cdot Vsp1 - Ve| \leq K_2 \cdot Ve$, it is concluded that the equality (1) applies with respect to Vsp1 or that the speed detectors 460 and 450 are functioning properly. Similarly, if $|K_1 \cdot Vsp2 - Ve| \leq K_2 \cdot Ve$, it is concluded that the equation (1) applies with respect to Vsp2 or that the speed detectors 420 and 450 are functioning properly. It will be seen that when the vehicle is running at lower speeds, the accuracy involved with the detection of the speeds Vsp1, Vsp2 and Ve will be reduced. Accordingly, a greater allowance is introduced at these lower speeds while a smaller allowance is used for higher speeds where a greater accuracy is available, by storing values of the constant $K_2$ in ROM 402 in a manner corresponding to the rotational speed Ve of the engine, as illustrated in FIG. 2e.

At step 72, a value of the constant $K_2$ is read from ROM 402 on the basis of the content of Ve register. Subsequently, when none of the vehicle speed 1 abnormality flag, vehicle speed 2 abnormality flag and Ve abnormality flag is set, the program proceeds through steps 73, 74 and 75, and compares $|K_1 \cdot Vsp1 - Ve|$ against $K_2 \cdot Ve$ at step 76, and compares $|K_1 \cdot Vsp2 - Ve|$ against $K_2 \cdot Ve$ (76, 77, 81).

As mentioned previously, $K_1$ is a constant which is determined by the particular speed range in which the change gearing operates, Vsp1 is data representing the speed detected by the vehicle speed sensor 460, Ve is the content of Ve register and Vsp2 is the content of Vsp2 register. When the following equalities or inequalities apply:

$$|K_1 \cdot Vsp1 - Ve| \leq K_2 \cdot Ve \quad (3)$$

$$|K_1 \cdot Vsp2 - Ve| \leq K_2 \cdot Ve \quad (4)$$

it is determined that all of Vsp1, Vsp2 and Ve are normal. When the relationship (3) applies while the relationship (4) does not apply, the vehicle speed 2 abnormality flag is set (84), thus energizing a light emitting diode 52 which alarms an abnormality associated with the pulse generator 420. When the relationship (3) does not apply while the relationship (4) applies, the vehicle speed 1 abnormality flag is set (82), thus energizing a light emitting diode 51 which alarms an abnormality associated with the vehicle speed sensor 460 (step 85). When neither relationship (3) nor (4) applies, the Ve abnormality flag is set (86), thus energizing the light emitting diodes 51 and 52 as well as a light emitting diode 53 which indicates an abnormality associated with the pulse generator 450. In this instance, an abnormality can occur in three manners; namely, Ve is faulty while both Vsp1 and Vsp2 are normal; Ve is normal while both Vsp1 and Vsp2 are faulty; and all of Ve, Vsp1 and Vsp2 are faulty. Accordingly, all of the three light emitting diodes 51 to 53 are energized for illumination. Among these three manners, the probability that a single sensor is faulty is higher than the probability that two or more sensors are faulty concurrently, and thus the probability that Ve is faulty will be the highest. It is to be noted that the light emitting diodes 51 to 53 are mounted on a display panel 500 (FIG. 1a) where they can be visually recognized by a driver.

When at least one of Vsp1 and Vsp2 is normal, a normal control over the shifting operation based on accurate speed data is enabled while when Ve is faulty, the control over the activation of the lockup will be erroneous. Hence, whenever the Ve abnormality flag is set, the lockup is terminated as indicated at steps 32a and 50 in FIG. 3b. Thus, the lockup is not used whenever Ve is faulty. When both Vsp1 and Vsp2 are normal, Vsp1 and Vsp2 are compared against each other (78), and if it is found that Vsp1 ≧ Vsp2, the vehicle speed 1 abnormality flag is cleared (79) while if it is found that Vsp1 < Vsp2, the vehicle speed 1 abnormality flag is set (80). It will be noted that the vehicle speed 1 abnormality flag may be set (80) even though both Vsp1 and Vsp2 are normal because the vehicle speed 1 abnormality flag is examined at step 202 shown in FIG. 3d to elect either Vsp2 or Vsp1 as the vehicle speed Vsp (the content of the vehicle speed register) in accordance with whether this flag is set or not. Since the flag register is cleared at the initialization step 1 shown in FIG. 3a, the vehicle speed 1 abnormality flag is cleared immediately after the initialization and accordingly Vsp1 is loaded into the vehicle speed register (Vsp1 predominating). When it is found at steps 78 and 79 that Vsp1 = Vsp2, again Vsp1 is loaded into the vehicle speed register (Vsp1 predominating). Vsp2 is loaded into the vehicle speed register only when Vsp1 < Vsp2.

As a result of the described processing operation, it is possible that the vehicle speed 1 abnormality flag may be set even though Vsp1 is normal. When this flag is set, it is examined whether the relationship (4) applies (91), and if the relationship does not apply (indicating that Vsp2 is faulty), the vehicle speed 1 abnormality flag is cleared (92), the vehicle speed 2 abnormality flag is set (93) and the light emitting diode 52 is energized for illumination. Under this condition, Vsp1 may also be faulty. If this is the situation, both Vsp1 and Vsp2 are faulty, and the control over the shifting operation will be erroneous if either one of them is used as a vehicle speed. It is highly possible that an abnormality relating to Vsp1 can be determined by a driver based on the vehicle speedmeter 48, and a vehicle speed sensor 460 is generally assembled with an abnormality detector circuit and many vehicles have a separate provision for an alarm or protective action in response to the occurrence of an abnormality relating to a vehicle speed sensor, so that in the present embodiment, the vehicle speed 1 abnormality flag is cleared (92) to use Vsp1 as a vehicle speed (202, 203) in such situations.

When the vehicle speed 1 abnormality flag is not set, but the vehicle speed 2 abnormality flag is set (73, 74), an examination is made to see if the relationship (3) holds (88). If it does not hold (indicating that Vsp1 is also faulty), the light emitting diode 51 is energized for illumination. If the relationship holds (indicating that Vsp1 is normal), the program proceeds through step 90 to clear the vehicle speed 1 abnormality flag (79).

Based on the vehicle speed 1 abnormality flag which may be set or reset at the speed sensor abnormality decision step 710, the vehicle speed Vsp is determined to be either Vsp1 or Vsp2 at steps 202 and 203, and based on the Ve abnormality flag which may be set or reset, the step 32a determines whether or not to activate the lockup.

In the above embodiment, the lockup is not activated if the Ve abnormality flag is set. Accordingly, the torque converter transmits the engine output to the change gearing under a fluid coupling condition. Accordingly, the fuel cost increases and the heating value within the torque converter increases.

To accommodate for this, in another embodiment of the invention, the control over the activation and the termination of the lockup is based on reference values of the vehicle speed which are previously stored in ROM 402 in a manner corresponding to each of the speed ranges, generally in the similar manner as the control over the activation and the termination of the lockup disclosed in U.S. Pat. No. 4,393,467 whenever the Ve abnormality flag is set.

Specifically, ROM 402 stores a throttle opening dependent, minimum vehicle speed $A_{Lu}$ at which the lockup is to be established in the second speed range, a throttle opening dependent, maximum vehicle speed $A_{Tc}$ at which the lockup is to be terminated in the second speed range, a throttle opening dependent minimum vehicle speed $B_{Lu}$ at which the lockup is to be established in the third speed range, a throttle opening dependent, maximum vehicle speed $B_{Tc}$ at which the lockup is to be terminated in the third speed range, a throttle opening dependent, minimum vehicle speed $C_{Lu}$ at which the lockup is to be established in the fourth speed range, and a throttle opening dependent, maximum vehicle speed $C_{Tc}$ at which the lockup is to be terminated in the fourth speed range.

Figure 4:
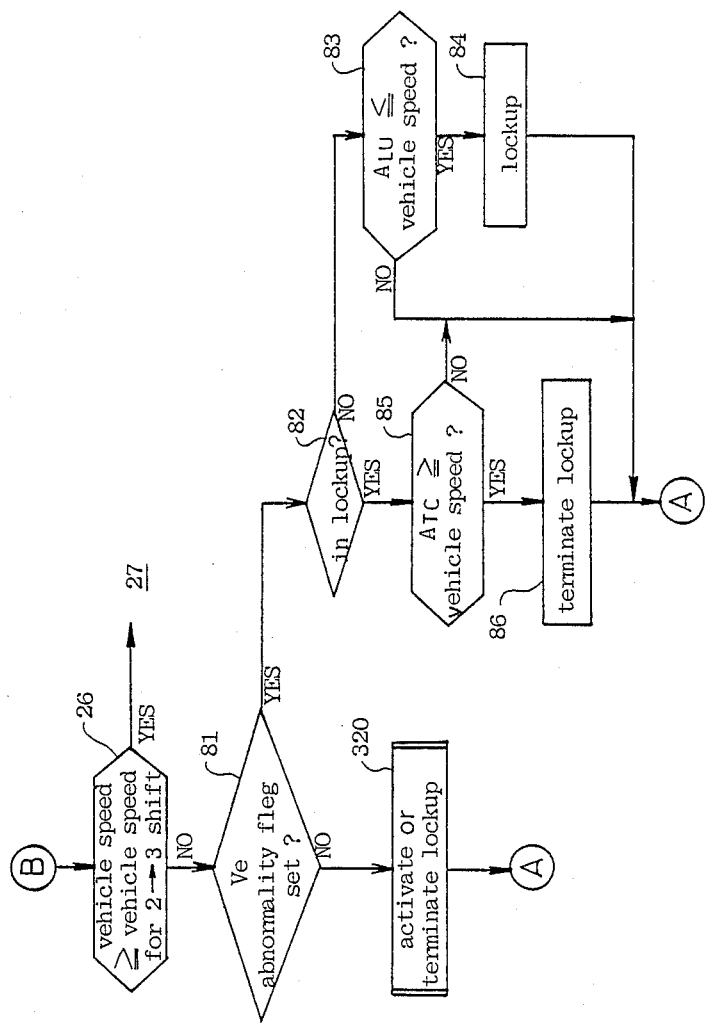
FIG. 4 is a flowchart of part of a control operation performed by a microprocessor in another embodiment of the invention.

When the change gearing 2 is operated in the second speed range, the Ve abnormality flag is examined as shown in FIG. 4, and if the flag is not set, the activation/termination of the lockup (320) is executed in the similar manner as in the previous embodiment. However, if the Ve abnormality flag is set, it is initially examined to see if the lockup condition is established (82), and if the lockup condition is established, the vehicle speed or the content of the vehicle speed register which is equal to Vsp2 if the vehicle speed 1 abnormality flag is set and to Vsp1 if the vehicle speed 1 abnormality flag is not set is compared against a particular value of the maximum vehicle speed $A_{Tc}$ which corresponds to the prevailing throttle opening (the content of THRO register). If the vehicle speed is equal to or less than the latter, the lockup is terminated (86). If the lockup condition has not been established, the vehicle speed is compared against a particular value of the minimum vehicle speed $A_{Lu}$ which corresponds to the prevailing throttle opening, and if the vehicle speed is equal to or greater than the latter, the lockup is established (84). It is to be noted that the flowchart shown in FIG. 4 is substituted for the flowchart shown in FIG. 3b used in connection with the first mentioned embodiment.

While not shown, the activation/termination of the lockup takes place in the similar manner in the third and the fourth speed range also, with mutatis mutandis changing of $A_{Lu}$ and $A_{Tc}$ to $B_{Lu}$ and $B_{Tc}$, respectively, in the third speed range and to $C_{Lu}$ and $C_{Tc}$, respectively, in the fourth speed range.

In the second embodiment, when the sensor which detects the rotational speed of the engine is faulty or when Ve abnormality flag is set, a decision to activate or terminate the lockup is based on the vehicle speed, enabling the lockup depending on the situation. Accordingly, the fuel cost is improved while reducing the heating value within the torque converter.

As described, in the control system of the invention, any abnormality relating to the sensor which detects the rotational speed of the engine as well as the pair of vehicle speed sensors is detected on the basis of a relative comparison between these three values (Ve, Vsp1 and Vsp2). As compared with a relative comparison between the values from the pair of vehicle speed sensors alone, an abnormality associated with any sensor can be detected with a higher accuracy. In particular, the detection of an abnormality relating to a sensor under the condition that both the vehicle speed sensors deliver speed signals is facilitated and can be achieved more accurately. In this manner, a control over the lockup and the shifting operation of the automatic transmission is based on detected values from speed sensors which have been determined as functioning properly, thus improving the reliability of the control over the lockup and the shifting operation.

What is claimed is:

1. A lockup control system for an automatic transmission including a torque converter having its input shaft coupled to an output shaft of an onboard engine, a directly coupled clutch providing a direct connection between the input and the output of the torque converter, a change gearing, and lockup activate means for turning the directly coupled clutch on and off;

the lockup control system comprising first and second detecting means for detecting the rotational speed of the output shaft of the change gearing;

third detecting means for detecting the rotational speed of the output shaft of the engine;

an electronic controller operative under the lockup condition of the torque converter to compare the rotational speed detected by the first detecting means and the rotational speed detected by the third detecting means, as weighted according to a particular speed range in which the change gearing operates, against each other, thereby determining any abnormality in the relative detection by the first and the third detecting means;

said electronic controller operative under the lockup condition of the torque converter to compare the rotational speed detected by the second detecting means and the rotational speed detected by the third detecting means, as weighted according to a particular speed range in which the change gearing operates, against each other, thereby determining any abnormality in the relative detection by the second and the third detecting means;

said electronic controller designating the speed detected by the first detecting means as the vehicle speed when it fails to determine both of the abnormalities in the relative detection by the first and the third detecting means and by the second and the third detecting means and for designating the speed detected by the second detecting means as the vehicle speed when the abnormality in the relative detection by the first and the third detecting means is determined, while the abnormality in the relative detection by the second and the third detecting means is failed to determine;

means for generating a signal representing an opening of a throttle valve of the engine;

first storage means for storing reference information which is to be referred to in determining the activation of the lockup in a manner corresponding to the opening of the throttle valve;

said electronic controller reading the reference information which corresponds to the opening of the throttle valve;

said electronic controller responsive to the designated vehicle speed and the reference information which is read out to determine the need for the lockup and for providing a lockup command to the lockup activate means when it is determined that there is a need for the lockup;

second storage means for storing lockup terminate reference information;

said electronic controller reading the lockup terminate reference information; and said electronic controller responsive to the designated vehicle speed and the lockup terminate reference information which is read out to determine the need for the termination of the lockup and for providing a lockup terminate command to the lockup activate means when it is determined that there is a need to terminate the lockup.

2. A lockup control system according to claim 1 in which the electronic controller calculates a speed ratio of the torque converter based on the designated vehicle speed, the particular speed range in which the change gearing operates and the rotational speed detected by the third detecting means, compares the speed ratio against the lockup activate reference information, to provide a lockup command to the lockup activate means when the speed ratio is equal to or greater than the lockup activate reference information, and stores the designated vehicle speed in the second storage means which stores the lockup terminate reference information, compares the designated vehicle speed against the vehicle speed stored in the second storage means from which a preset value is subtracted, and provides a lockup terminate command to the lockup activate means when the former is equal to or less than the latter.

3. A lockup control system according to claim 2 in which the first storage means stores an adjust value for the designated vehicle speed which is dependent on the opening of the throttle valve, and specifies an adjust value for the designated vehicle speed which corresponds to the opening of the throttle valve that is being detected by the means for generating the signal representing the opening of the throttle valve as the preset value.

4. A lockup control system according to claim 3 in which the first storage means stores a plurality of sets of adjust values for the designated vehicle speed which depend on the opening of the throttle valve, specifies a particular set in response to a corresponding signal, and specifies a particular adjust value in the particular set which corresponds to the opening of the throttle valve that is being detected by the means for generating the signal representing the opening of the throttle valve as the preset value.

5. A lockup control system according to claim 1 in which the electronic controller provides a lockup terminate command to the lockup activate means when it determines both the abnormality in the relative detection by the first and the third detecting means and the abnormality in the relative detection by the second and the third detecting means 6. A lockup control system according to claim 1 in which when the electronic controller fails to determine either one of the abnormalities in the relative detection by the first and the third detecting means and by the second and the third detecting means, it calculates a speed ratio of the torque converter based on the designated vehicle speed, a particular speed range in which the change gearing operates and the rotational speed detected by the third detecting means, compares the calculated speed value against the lockup activate reference information, provides a locup command to the lockup activate means when the former is equal to or greater than the latter, and stores the designated vehicle speed in the second storage means which stores the lockup terminate reference information, and compares the designated vehicle speed against the designated vehicle speed in the second storage means from which a preset value is subtracted, and provides a lockup terminate command to the lockup activate means when the former is equal to or less than the latter, and in which when the electronic controller determines both of the abnormalities in the relative detection by the first and the third detecting means and by the second and the third detecting means, it compares the designated vehicle speed against a vehicle speed dependent, lockup activate reference information, and provides a lockup command to the lockup activate means when the former is equal to or greater than the latter, and compares the designated vehicle speed against a vehicle speed dependent, lockup terminate reference information, and provides a lockup terminate command to the lockup activate means when the former is equal to or less than the latter.

7. A shift control system for an automatic transmission including a torque converter having its input shaft coupled to an output shaft of an onboard engine, a directly coupled clutch providing a direct connection between the input and the output shaft of the torque converter, a change gearing, lockup activate means for turning the directly coupled clutch on and off, and select means for selecting a particular speed range in which the change gearing operates;

the shift control system comprising first and second detecting means for detecting the rotational speed of the output shaft of the change gearing;

third detecting means for detecting the rotational speed of the output shaft of the onboard engine;

an electronic controller operative under the lockup condition to compare the rotational speed detected by the first detecting means and the rotational speed detected by the third detecting means, as weighted according to a particular speed range in which the change gearing operates, against each other, thereby determining the occurrence of an abnormality in the relative detection by the first and the third detecting means;

said electronic controller operative under the lockup condition to compare the rotational speed detected by the second detecting means and the rotational speed detected by the third detecting means, as weighted according to a particular speed range in which the change gearing operates, against each other, thereby determining the occurrence of an abnormality in the relative detection by the second and the third detecting means;

said electronic controller designating a speed detected by the first detecting means as a vehicle speed when it fails to determine both of the abnormalities in the relative detection by the first and the third detecting means and by the second and the third detecting means and for designating a speed detected by the second detecting means as a vehicle speed when the abnormality in the relative detection by the first and the third detecting means is determined while the abnormality in the relative detection by the second and the third detecting means is not determined;

means for generating a signal representing an opening of a throttle valve of the engine;

first storage means for storing an up shift and a down shift reference information which are dependent on the opening of the throttle valve and a speed range;

said electronic controller reading the up shift and the down shift reference information in a manner corresponding to the opening of the throttle valve and the particular speed range in which the change gearing operates; and said electronic controller comparing the designated vehicle speed against the up shift reference information which is read out to provide an up shift command to a higher speed range to the select means whenever the former is equal to or greater than the latter and for comparing the designated vehicle speed against the down shift reference information which is read out to provide a down shift command to a lower speed range to the select means whenever the former is equal to or less than the latter.

8. A lockup and shift control system for an automatic transmission including a torque converter having its input shaft coupled to an output shaft of an onboard engine, a directly coupled clutch providing a direct connection between the input and the output shaft of the torque converter, a change gearing, lockup activate means for turning the directly coupled clutch on and off, and select means for selecting a particular speed range in which the change gearing is to operate;

the control system comprising first and second detecting means for detecting the rotational speed of the output shaft of the change gearing;

third detecting means for detecting the rotational speed of the output shaft of the onboard engine;

an electronic controller operative under the lockup condition to compare the rotational speed detected by the first detecting means and the rotational speed detected by the third detecting means, as weighted according to a particular speed range in which the change gearing operates, against each other, thereby determining the occurrence of an abnormality in the relative detection by the first and the third detecting means;

said electronic controller operative under the lockup condition to compare the rotational speed detected by the second detecting means and the rotational speed detected by the third detecting means, as weighted according to a particular speed range in which the change gearing operates, against each other, thereby determining the occurrence of an abnormality in the relative detection by the second and the third detecting means;

said electronic controller designating a speed detected by the first detecting means as a vehicle speed when it fails to determine both of the abnormalities in the relative detection by the first and the third detecting means and by the second and the third detecting means and for designating a speed detected by the second detecting means a vehicle speed when the abnormality in the relative detection by the first and the third detecting means is determined while the abnormality in the relative detection by the second and the third detecting means is not determined;

means for generating a signal which represents opening of a throttle valve of the engine;

first storage means for storing lockup activate reference information, which depends on the opening of the throttle valve;

said electronic controller reading the lockup activate reference information in a manner corresponding to the opening of the throttle valve;

said electronic controller determining the need for a lockup on the basis of the designated vehicle speed and lockup activate reference information which is read out and for providing a lockup command to the lockup activate means when it is determined that there is a need for a lockup;

second storage means for storing lockup terminate reference information;

said electronic controller reading the lockup terminate reference information;

said electronic controller determining the need to terminate the lockup based on the designated vehicle speed and the lockup terminate reference information which is read out for providing a lockup terminate command to the lockup activate means when it is determined that there is a need to terminate the lockup;

third storage means for storing an up shift and a down shift reference information which depend on the opening of the throttle valve and a speed range;

said electronic controller reading the up shift and the down shift reference information in a manner corresponding to the opening of the throttle valve and a particular speed range in which the change gearing operates; and said electronic controller comparing the designated vehicle speed against the up shift reference information which is read out to provide an up shift command to a higher speed range to the lockup activate means whenever the former is equal to or greater than the latter and comparing the designated vehicle speed against the down shift reference information which is read out to provide a down shift command to a lower speed range to the lockup activate means whenever the former is equal to or less than the latter.

9. A lockup and shift control system according to claim 8 in which the electronic controller calculates a speed ratio of the torque converter based on the designated vehicle speed, a particular speed range in which the change gearing operates and the rotational speed detected by the third detecting means, compares the calculated speed ratio against the lockup activate reference information, to provide a lockup command to the lockup activate means whenever the former is equal to or greater than the latter and stores the designated vehicle speed in the second storage means which stores lockup terminate reference information, and in which the electronic controller compares the desigated vehicle speed against the vehicle speed stored in the second storage means from which a preset value is subtracted, and provides a lockup terminate command to the lockup activate means whenever the former is equal to or less than the latter.

10. A lockup and shift control system according to claim 9 in which the first storage means stores an adjust value for the designated vehicle speed which depends on the opening of the throttle valve and specifies a particular adjust value for the rotational speed which corresponds to the opening of the throttle valve, that is being detected by the means for generating the signal representing the opening of the throttle valve as the present value.

11. A lockup and shift control system according to claim 10 in which the first storage means stores a plurality of sets of adjust values for the designated vehicle speed which depend on the opening of the throttle valve, specifies a particular set in response to a corresponding signal, and specifies a particular adjust value in the particular set which corresponds to the opening of the throttle valve that is being detected by the means for generating the signal representing the opening of the throttle valve as the preset value.

12. A lockup and shift control system according to claim 11 in which the electronic controller provides a lockup terminate command to the lockup activate means when it determines both of the abnoralities in the relative detection by the first and the third detecting means and by the second and the third detecting means.

13. A lockup and shift control system according to claim 8 in which when the electronic controller fails to determine either one of the abnormalities in the relative detection by the first and the third detecting means and by the second and the third detecting means, it calculates a speed ratio of the torque converter based on the designated vehicle speed, a particular speed range in which the change gearing operates and the rotational speed detected by the third detecting means, compares the calculated speed ratio against the lockup activate reference information, provides a lockup command to the lockup activate means when the former is equal than the latter, and stores the designated vehicle speed in the second storage means which stores the lockup terminate reference information, and compares the designated vehicle speed against the vehicle speed stored in the second storage means from which a preset value is substracted and provides a lockup terminate command to the lockup activate means when the former is equal to or less than the latter, and in which when the electronic controller determines both of the abnormalities in the relative detection by the first and the third detecting means and by the second and the third detecting means, it compares the designated vehicle speed against a vehicle speed dependent lockup activate reference information and provides a lockup command to the lockup activate means when the former is equal to or greater than the latter, and compares the designated vehicle speed against a vehicle speed dependent, lockup terminate reference information and provides a lockup terminate command to the lockup activate means when the former is equal to or less than the latter.

* * * * *